July 6, 1926.
J. M. STONE
DUST CAGE
Filed July 9, 1924
1,591,342
2 Sheets-Sheet 1
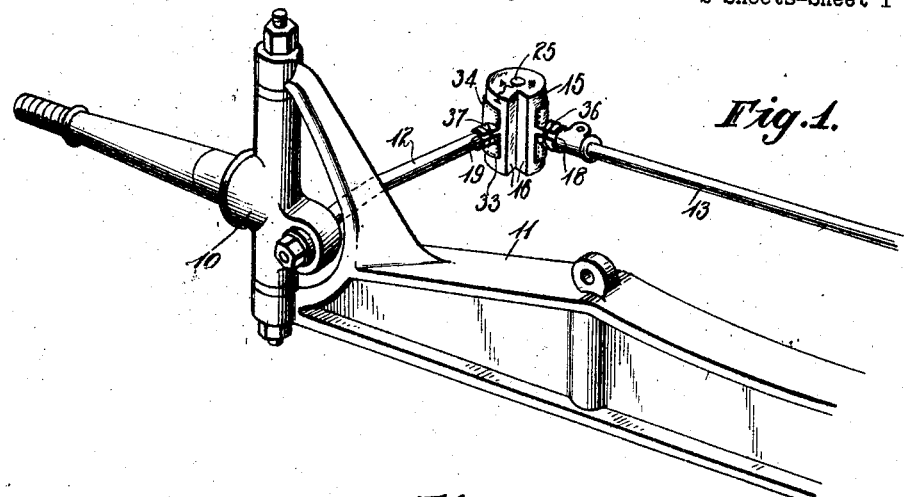
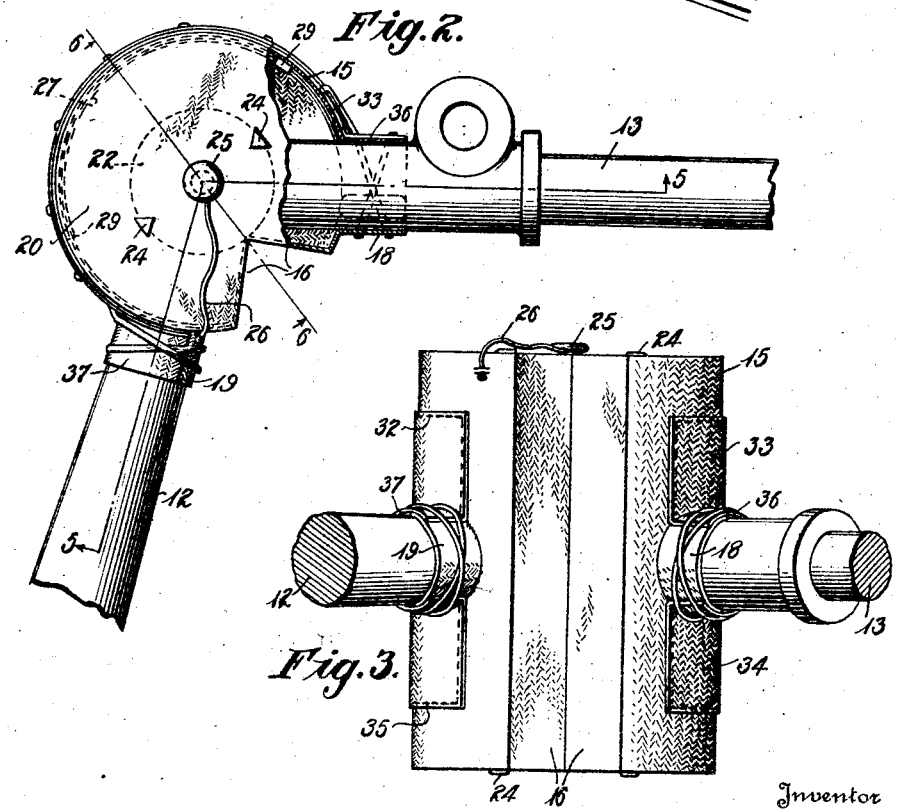
Inventor
Jacob M. Stone
By Brower & Phelps
Attorneys

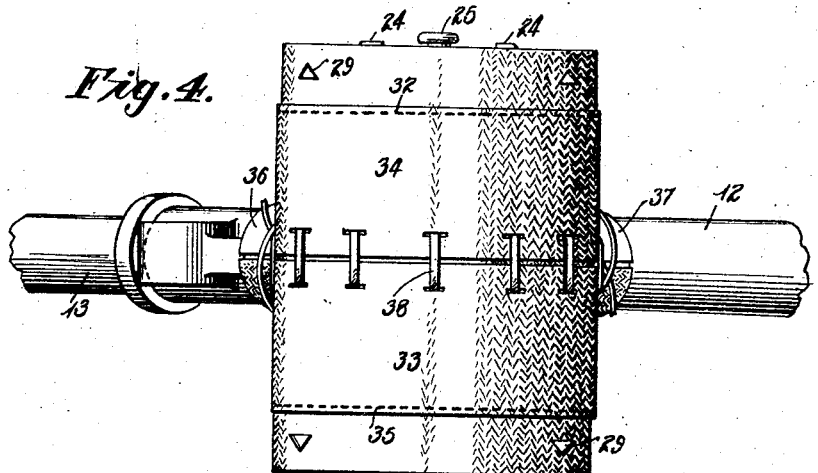
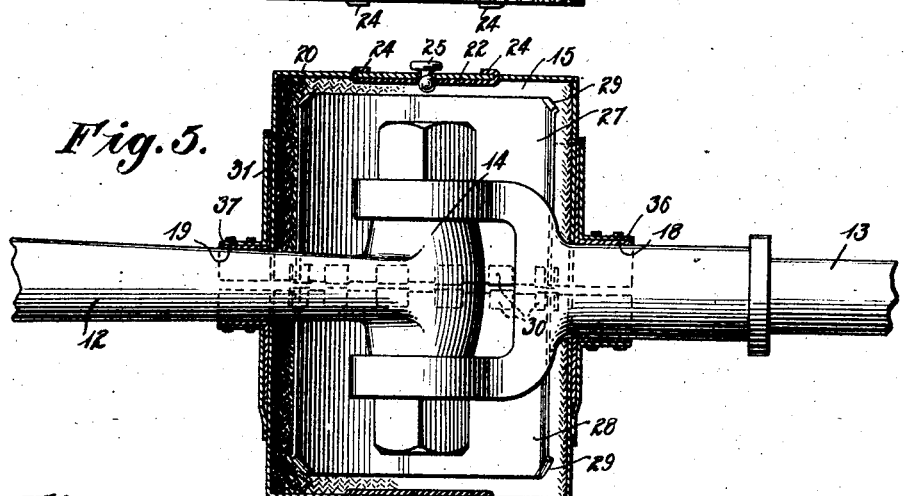
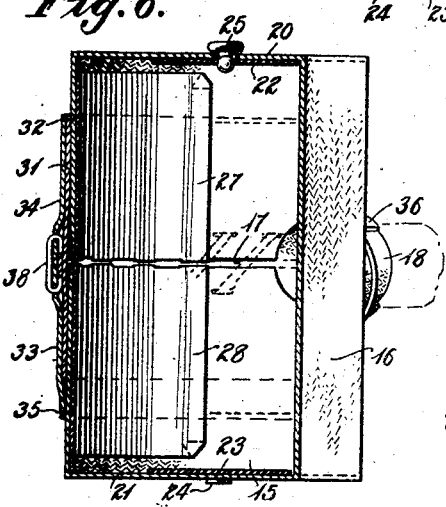

Patented July 6, 1926.

1,591,342

UNITED STATES PATENT OFFICE.

JACOB M. STONE, OF BRECKENRIDGE, TEXAS.

DUST CAGE.

Application filed July 9, 1924. Serial No. 725,042.

The invention relates to dust cages, and has as an object the provision of a means for protecting a joint upon a vehicle from dust.

A further object of the invention is the provision of a dust protecting device particularly adaptable to the joint between a steering rod and the steering arm of a vehicle.

A further object of the invention is the provision of a dust cage having means to permit hinge action of the parts enclosed thereby.

Further objects of the invention will appear from the following description when read in connection with the accompanying drawing showing an illustrative embodiment of the invention, and wherein Fig. 1 is a perspective view of the device in place upon a joint between a steering rod and a steering arm.

Fig. 2 is a plan view, partly broken away, of the device in place.

Fig. 3 is an elevation of the device viewed at an angle to hingedly connected parts which are joined by the enclosed joint.

Fig. 4 is an elevation from a position diametrically opposite from the view of Fig. 3.

Fig. 5 is a broken section on broken line 5, 5 of Fig. 2.

Fig. 6 is a vertical section on line 6, 6 of Fig. 2, the enclosed joint omitted, and Fig. 7 is a perspective view of one of the plates utilized as stiffening means.

As shown in Fig. 1, the steering knuckle 10 is carried by the axle 11, and has secured thereto the steering arm 12, adapted to be operated by the tie rod 13, the parts being of the type utilized in the Ford automobile.

The joint 14, shown in Fig. 5, as ordinarily used, is freely exposed to the dust of the road, or field, and the dust adhering to lubricant and working its way to the interior of the joint, results in very rapidly abrading the bolt upon which the joint acts.

To protect the joint from the dust, there is provided by the present invention a cage 15 of cylindrical form, with closed ends, the cylindrical surface being broken by angularly extending walls 16, to allow for change of the angular relation between the parts 12, 13.

The device is desirably formed of leather or fabric having similar qualities, and the cylindrical wall thereof may be formed in a single piece, with a horizontal slit, as at 17, severing the device throughout substantially one-half of the cylinder.

To surround the portions 12 and 13 where they extend to the interior of the cage, collars 18, 19 are provided, preferably formed integral with the material of the cylinder, the collar being divided by the continuation of the slit 17.

The ends of the cylinder are shown as closed by disk-like closures of the same material, at 20, 21, the disks mentioned having a horizontal incision, to the edges of which the walls of the recess 16 may be secured. The ends of the cylinder may be secured to the disks 20, 21 about their peripheries as by sewing. To stiffen the disks 20, 21, there are shown disks of metal, as tin, at 22, 23, shown as secured to the interior surface of the disks 20, 21, by means of integral ears 24, forced through the material of the disks 20, 21, and clinched. The upper disk 20 is preferably formed with a lubricant opening which may be closed by means of a plug 25, shown as attached to a string 26 secured to the device to prevent loss of the plug.

To stiffen the cylinder 15 throughout a portion of its extent whereby to preserve the vertical form from collapse, there are shown metal plates, as of tin, as at 27, 28, one of which is shown in perspective, in Fig. 7. These plates may be secured to the material of the cylinder, as by ears 29, at their outer ends, which may be forced through the material of the cylinder and clinched, and by tabs 30 turned up from the material of the inner ends of the plates and about the edge of the material of the cylinder along the slit 17.

To close the slit 17 when the device is in place, there is shown a flap 31 which may be secured by a line of stitching 32 at its upper edge, and which extends to a position well below the slit 17, and two additional flaps 33, 34, the former secured by a line of stitching 35, to the wall of the cylinder 15, at a point below the edge of the flap 31, and the latter secured by the line of stitching 32, already referred to. The flaps 33, 34 are preferably provided with flanged extensions 36, 37, adapted to partially surround the parts 12, 13, and to cover the portion of the slit 17 which extends into the collars 18, 19.

To place the device, the flaps 31, 33 and 34 are turned back. The slit 17 is opened, the flexible wall of the cylinder, including the recess 16 being bent to allow the slit to open sufficiently to pass over the joint 14, when the device is closed with the collars 18, 19 surrounding the parts 12, 13, and the edges of the cylinder meeting with the wall of the cylinder in its normal position.

The flap 31 is then turned down to cover the slit 17, and the flaps 33, 34 are then turned down to cover the flap 31 when the edges of the flaps 33, 34 are united by any desirable fastening. A suitable form of fastening is that shown as a lacing 38 passing through holes adjacent the edges of the flaps 33, 34, and wrapped around the flanges 36, 37 to secure the whole tightly upon the parts 12, 13. If desired, the interior of the cage may be packed with lubricant.

Minor changes may be made in the physical embodiment of the invention without departing from its spirit.

I claim:

1. A dust cage comprising a cylindrical casing adapted to enclose a joint, means to surround the parts attached to the joint where they extend through the walls of the cylinder, and means extending parallel with the axis of the cylinder to produce flexibility of one portion of the wall of the cylinder to permit of variation of the angular relation of said projecting parts.

2. A dust cage comprising, in combination, a cylindrical casing adapted to enclose a joint, the axis of the cylinder coinciding with the pivotal axis of the joint, means to surround the parts where they extend through the wall of the casing, a reentrant angle in a wall of the casing to provide flexibility of said wall whereby variation of the angular relation of said projecting parts may be accommodated.

3. A dust cage comprising, in combination, a cylinder of flexible material having a portion of its periphery formed with a reentrant angle in planes parallel to the axis of the cylinder to provide hinging action of the walls of the cylinder, stiffening means for the wall of the cylinder opposite said reentrant angle, said cylinder having openings for passage of parts projecting from a joint to be enclosed thereby, means to surround said projecting parts whereby to prevent entry of dust.

4. A dust cage comprising, in combination, a cylindrical casing of flexible material, means to preserve rigidity of a portion of the periphery of said casing, disk-like closures for the ends of said casing, rigidity preserving means over a portion of said disks, and means to permit of lubrication of an enclosed joint.

5. A dust cage comprising, in combination, a substantially cylindrical casing of flexible material having a transverse slit, a piece of sheet metal within said cylinder at each side of the slit and extending throughout a portion of the periphery of the cylinder, said pieces having tabs bent about the margin of the slit and having means to secure said pieces to the interior of the cylinder, overlapping flaps secured to the exterior of the cylinder and closing said slit, means to secure said flaps in position, openings through the wall of the cylinder adapted to surround members extending from an enclosed joint projecting from the cylinder perpendicular to the axis thereof, means carried by the cylinder to surround said projecting members, said cylinder having an interrupted portion, the flexible material forming the walls of said cylinder projecting from the margin of said interrupted portion into a reentrant angle in planes parallel with the axis of the cylinder, discs enclosing the end of the cylinder, and means to preserve the rigidity of said discs.

JACOB M. STONE.